US012291808B2

(12) United States Patent
Liu et al.

(10) Patent No.: US 12,291,808 B2
(45) Date of Patent: May 6, 2025

(54) HEAT SUPPLY-ENERGY-SAVING EQUIPMENT FOR PRINTING AND DYEING FACTORY

(71) Applicant: GUANGDONG UNIVERSITY OF TECHNOLOGY, Guangzhou (CN)

(72) Inventors: Xiaozhou Liu, Guangzhou (CN); Zebin Fu, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/939,456

(22) Filed: Nov. 6, 2024

(65) Prior Publication Data

US 2025/0060093 A1 Feb. 20, 2025

Related U.S. Application Data

(63) Continuation of application No. PCT/CN2022/121195, filed on Sep. 26, 2022.

(30) Foreign Application Priority Data

Jul. 8, 2022 (CN) ......................... 202210799727.5

(51) Int. Cl.

*D06B 23/22* (2006.01)
*B41J 3/407* (2006.01)
(Continued)

(52) U.S. Cl.

CPC ............ *D06B 23/22* (2013.01); *B41J 3/4078* (2013.01); *B41J 11/0024* (2021.01); *B41J 29/00* (2013.01);
(Continued)

(58) Field of Classification Search

CPC ...... B41J 3/4078; B41J 11/0024; B41J 29/00; D06B 23/22; D06P 1/0032; D06P 1/22;
(Continued)

(56) References Cited

U.S. PATENT DOCUMENTS 3,134,827 A * 5/1964 Pontow .................. F22G 5/126 137/895

FOREIGN PATENT DOCUMENTS

CN 103015096 A 4/2013
CN 103994330 A * 8/2014
(Continued)

OTHER PUBLICATIONS

CN-103994330-A—Translation (Year: 2014).*
(Continued)

*Primary Examiner* — Steven B Mcallister
*Assistant Examiner* — Benjamin W Johnson

(57) ABSTRACT

A heating-energy-saving equipment for printing and dyeing factory, including: a heat source generator, a first ejector, a second ejector, a setting machine and a flash drum; a steam outlet of the heat source generator is connected to an injection port of the first ejector through a pipeline, an outlet of the first ejector is connected to an injection port of the second ejector, the water outlet of the flash drum is provided with a second branch pipe which is connected to the first ejector port of the second ejector, and the steam outlet of the flash drum is connected to the second ejector port of the second ejector, the present invention can save energy and reduce production costs; can be improved upon the existing equipment without changing the main structure of existing equipment, and it is very easy to implement; can reduce the discharge heat loss and environmental pollution.

8 Claims, 2 Drawing Sheets

(51) Int. Cl.

| | |
|---|---|
| ***B41J 11/00*** | (2006.01) |
| ***B41J 29/00*** | (2006.01) |
| ***D06P 1/00*** | (2006.01) |
| ***D06P 1/22*** | (2006.01) |
| ***F22B 1/18*** | (2006.01) |
| ***F22G 5/12*** | (2006.01) |
| ***F26B 21/00*** | (2006.01) |
| *D06C 7/02* | (2006.01) |
| *F22B 3/04* | (2006.01) |
| *F23G 7/00* | (2006.01) |
| *F28D 7/04* | (2006.01) |

(52) U.S. Cl.
CPC .............. *D06P 1/0032* (2013.01); *D06P 1/22* (2013.01); *F22B 1/18* (2013.01); *F22G 5/126* (2013.01); *F26B 21/002* (2013.01); *D06C 7/02* (2013.01); *F22B 3/04* (2013.01); *F22G 5/12* (2013.01); *F23G 7/00* (2013.01); *F26B 21/001* (2013.01); *F28D 7/04* (2013.01)

(58) Field of Classification Search
CPC .... F22B 1/18; F22B 3/04; F22G 5/126; F22G 5/12; F26B 21/002; F26B 21/001; D06C 7/02; F23G 7/00; F28D 7/04
USPC .......................................................... 122/1 R
See application file for complete search history.

(56) References Cited

FOREIGN PATENT DOCUMENTS

| | | | | | |
|---|---|---|---|---|---|
| CN | 104358060 | A | | 2/2015 | |
| CN | 205372707 | U | * | 7/2016 | |
| CN | 205474406 | U | | 8/2016 | |
| CN | 111485350 | A | | 8/2020 | |
| CN | 114705076 | A | | 7/2022 | |
| EP | 3896214 | A1 | * | 10/2021 | ........... D06F 58/206 |
| GB | 1122479 | A | | 8/1968 | |
| JP | 2001123384 | A | | 5/2001 | |
| KR | 20190029436 | A | | 3/2019 | |

OTHER PUBLICATIONS

CN-205372707-U—Translation (Year: 2016).*
Internation Search Report of PCT/CN2022/121195, Mailed Dec. 19, 2022.

* cited by examiner

Prior Art

HEAT SUPPLY-ENERGY-SAVING EQUIPMENT FOR PRINTING AND DYEING FACTORY

CROSS-REFERENCE TO RELATED APPLICATIONS

The present disclosure is a continuation-application of International (PCT) Patent Application No. PCT/CN2022/121195, filed on Sep. 26, 2022, which claims priority of Chinese Patent Application No. 202210799727.5, filed on Jul. 8, 2022, the entire contents of which are hereby incorporated by reference in their entirety.

TECHNICAL FIELD

The invention relates to the technical field of heat supply in printing and dyeing factories, in particular to an energy-saving and cost-reducing heat supply-energy-saving optimization equipment for a printing and dyeing factory.

BACKGROUND

As shown in FIG. 1, in a heat supply equipment of a prior art printing and dyeing factory, the discharge water generated after the setting machine works is discharged into the flash drum, and steam with a pressure of 0.8 MPa and a temperature of about 170° C. is generated in the flash drum. In order to recycle the waste heat from the setting machine, the steam generated in the flash drum is deoxidized by a deaerator, and then input into a heating device to further add hot water to form high-temperature and high-pressure steam with a temperature of 405° C. and a pressure of 4.2 MPa. The high-temperature and high-pressure steam needs to be lowered in temperature and pressure before it can be used in the setting machine, so the high-temperature and high-pressure steam passes through the cooling and pressure reducing device to form a temperature of 300° C. and a pressure of 2.5 MPa working steam. Then, the working steam is input into the setting machine to heat and do work, and after working in the setting machine, low temperature condensate water with a temperature of 170° C. and a pressure of 2.0 MPa is formed, which is discharged into the flash drum for storage, and besides the steam from the flash drum is recycled directly into the deaerator, the high-temperature condensate water produced by the flash drum is directly discharged, which cannot be used efficiently. Here, in the cooling and pressure reducing device, in order to reduce the high-temperature and high-pressure steam to a working steam suitable for use, the measure of using cold water to forcibly reduce the temperature and compression is adopted, in which a large amount of heat source is wasted, and it will cause environmental pollution.

In addition, after the fabric in the printing and dyeing factory is dyed by a dyeing vat, it needs a lot of energy to dry the fabric. Currently, the energy used for drying is electric heating equipment, which consumes a lot of energy and greatly increases the production cost. However, part of the low temperature condensate water in the flash drum enters a treatment equipment or is discharged directly, resulting in a huge loss of heat energy, which makes the energy utilization rate of the printing and dyeing factory low, not only causing a lot of energy waste, but also seriously polluting the environment. Therefore, the waste water discharge and energy saving and cost reduction of printing and dyeing factories are common technical problems to be solved in the industry.

SUMMARY OF THE INVENTION

An object of the present invention is to address the drawbacks of the above-mentioned prior art, and provide an energy-saving and environment-friendly energy-saving and cost-reducing heat supply-energy-saving optimization equipment for a printing and dyeing factory formed by reforming the existing structure.

In order to achieve the above object, the technical solution adopted by the present invention for solving the above technical problems is as follows: a heating-energy-saving optimization equipment for a printing and dyeing factory, includes: a heat source generator, a first ejector, a second ejector, a setting machine and a flash drum; a steam outlet of the heat source generator is connected to an injection port of the first ejector through a pipeline, an outlet of the first ejector is connected to an injection port of the second ejector, an outlet of the second ejector is connected to a steam input port of the setting machine, a waste steam discharge port of the setting machine is connected to an input port of the flash drum through a pipeline, a water outlet of the flash drum is provided with a first branch pipe connected to the injection port of the first ejector, the second ejector is provided with a first ejector port and a second ejector port, the water outlet of the flash drum is provided with a second branch pipe which is connected to the first ejector port of the second ejector, and the steam outlet of the flash drum is connected to the second ejector port of the second ejector.

Furthermore, a first control valve is provided between the heat source generator and the injection port of the first ejector, and a second control valve is provided between the first ejector and the second ejector.

A third control valve is disposed between the flash drum and the first ejector, and a fourth control valve and a fifth control valve are respectively disposed between the flash drum and the ejector ports of the second ejector. Through corresponding adjustment, the high-temperature and high-pressure steam supplied by the heat source generator can be adjusted into working steam of intermediate temperature and pressure without loss of heat source.

A heat exchange coil is arranged in the flash drum, and the heat exchange coil is connected with a third heat exchanger to form a heat exchange circulation pipeline; a heat source inlet of the third heat exchanger is connected to the waste steam discharge port of the setting machine, and a heat source outlet of the third heat exchanger is connected to the end of the waste steam discharge port of the setting machine.

Furthermore, the heat source generator is a waste heat boiler. or a waste incineration boiler.

Furthermore, the heat source generator is a waste incineration boiler.

The printing and dyeing factory also includes a dyeing vat and drying unit. The water temperature of dyeing vat is much lower than the discharge water of the flash drum. In order to effectively utilize the waste heat discharged from the setting machine, the flash drum is provided with a second water outlet which is connected to the dyeing vat, and part of the hot water is added to the dyeing vat to adjust the temperature of the dyeing vat.

In order to prevent the discharged hot water from polluting the dyeing vat, a filter device is provided on the pipeline between the flash drum and the dyeing vat.

A buffer tank is set between the flash drum and the dyeing vat, the hot water of the flash drum enters the dyeing vat after passing through the buffer tank, and the flash hot water can be flexibly adjusted to the dyeing vat according to the steps of the printing and dyeing process.

A second heat exchanger is arranged on a connecting pipeline between the flash drum and the dyeing vat. After passing through the second heat exchanger through a fan, the cold air exchanges heat with the hot water at 140° C. to form hot air, which provides hot air for the drying unit through the connection between the pipeline and the drying unit, and dries the printed fabric, which can effectively reduce the energy consumption of the drying unit and save production costs.

A first heat exchanger is arranged on the steam discharge port of the setting machine, the cold air input pipe is connected to an air inlet of the first heat exchanger through a fan, and an air outlet of the first heat exchanger is connected to an inner cavity of the setting machine.

Compared with prior art, the present invention has the following good effects: (1) two ejectors in series are employed to replace the existing cold water forced cooling and pressure reducing device, and flash water and steam with residual temperature is also employed to adjust the high-temperature and high-pressure steam, which can effectively save energy and reduce production costs; (2) it can be improved upon the existing equipment without changing the main structure of existing equipment, and it is very easy to implement; and (3) it can greatly reduce the discharge heat loss and environmental pollution.

DETAILED DESCRIPTION

The present invention will be described in detail below in conjunction with the accompanying drawings and specific embodiments. Accompanying drawing has shown the concrete structure of preferred embodiment of the present invention. The structural characteristics of each element, if there is a description of the direction (up, down, left, right, front and rear), it is described with reference to the structure shown in the figure, but the actual use direction of the present invention is not thus limited.

Figure 1:
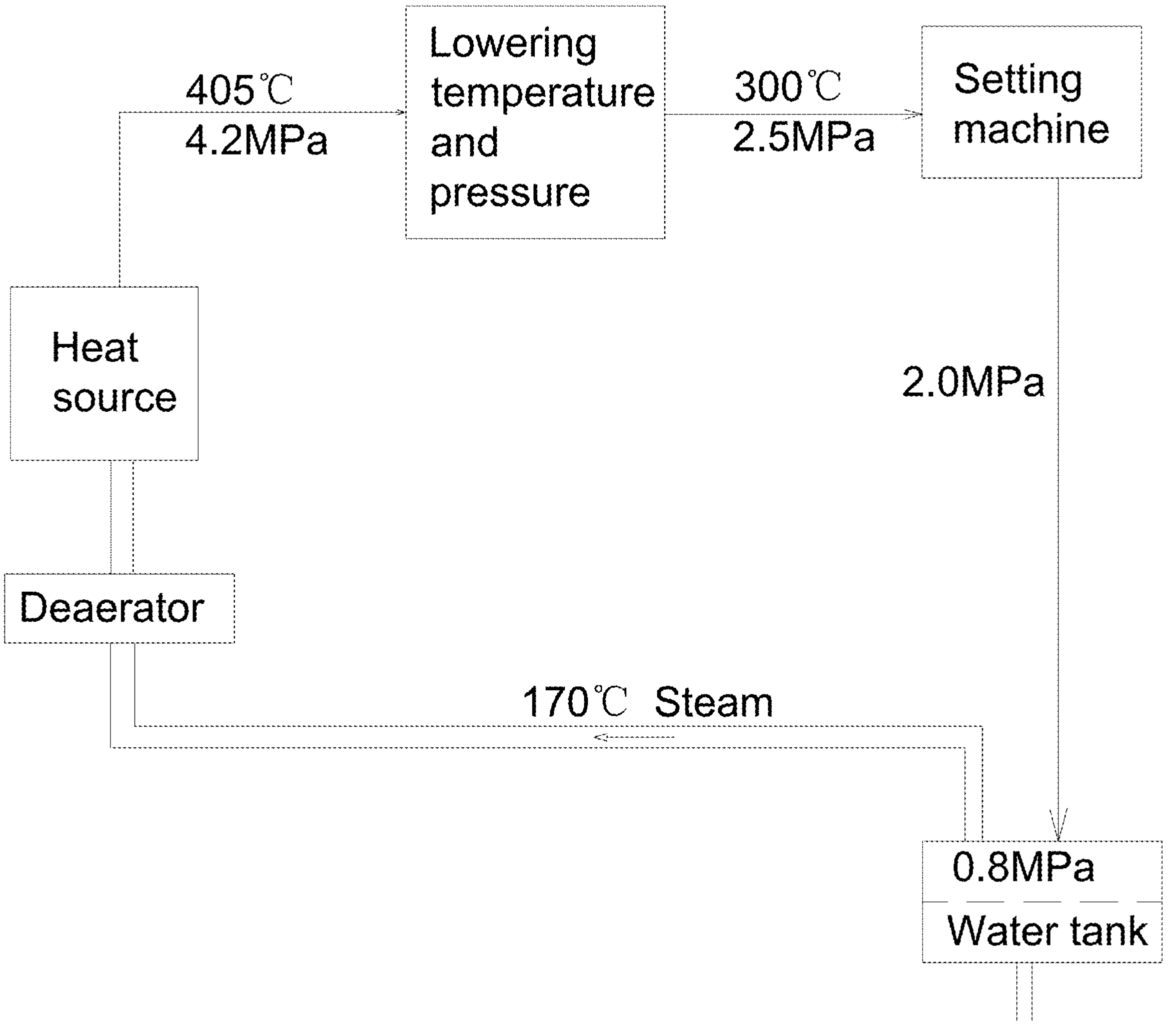
FIG. 1 is a structural schematic diagram of a heat supply equipment of a printing and dyeing factory in prior art.
Figure 2:
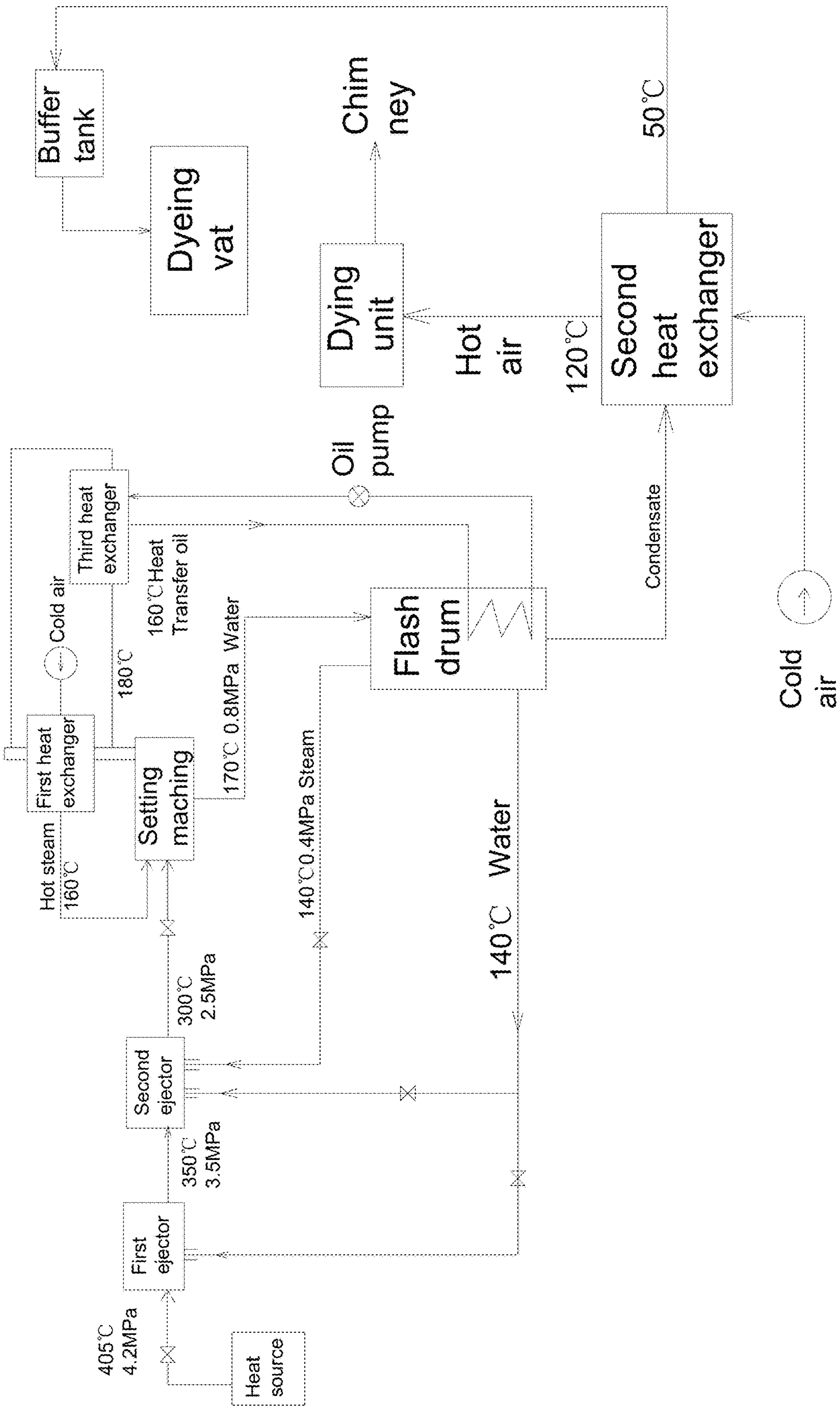
FIG. 2 is a schematic diagram of the equipment structure of a heat supply-energy-saving optimization equipment for the printing and dyeing factory according to the present invention.

A heating-energy-saving optimization equipment for a printing and dyeing factory, as shown in FIG. 2, includes a heat source generator, a first ejector, a second ejector, a setting machine and a flash drum; a steam outlet of the heat source generator is connected to an injection port of the first ejector through a pipeline, an outlet of the first ejector is connected to an injection port of the second ejector, and an outlet of the second ejector is connected to a steam input port of the setting machine, a waste steam discharge port of the setting machine is connected to an input port of the flash drum through a pipeline, and a water outlet of the flash drum is provided with a first branch pipe connected to the injection port of the first ejector; the second ejector is provided with two ejector ports (a first ejector port and a second ejector port respectively), the water outlet of the flash drum is provided with a second branch pipe which is connected to the first ejector port of the second ejector, and the steam outlet of the flash drum is connected to the second ejector port of the second ejector.

The heat source generator produces high-temperature and high-pressure steam with a temperature of 405° C. and a pressure of 4.2 MPa. The high-temperature and high-pressure steam forms a high-speed, high-energy flow through the injection ports of two ejectors connected in series, and then it directs the hot water in the flash drum and the flash steam into a mixing chamber of the ejector for mixing, and the high-temperature and high-pressure steam is adjusted with hot water to a working steam with a temperature of 300° C. and a pressure of 2.5 MPa suitable for the setting machine, by controlling the injection volume or ejection volume. The two ejectors and setting machine in series have high-temperature waste heat exhaust gas and high-temperature condensate water, thereby replacing the cooling and pressure-reducing device and the peripheral cold source medium in the prior art technical solution, which can avoid heat loss and reduce energy consumption. It can effectively save energy, and does not require major changes to the existing production equipment, and is extremely simple to implement. Specifically, the steam outlet of the heat source generator is connected to the injection port of the first ejector through a pipeline, the outlet of the first ejector is connected to the injection port of the second ejector, and the outlet of the second ejector is connected to the steam input port of the setting machine. The condensate water in the flash drum with a temperature of 140° C. is sucked by the first ejector through the first branch pipeline, and then mixed with high-temperature and high-pressure steam with a temperature of 405° C. and a pressure of 4.2 MPa to form steam with a temperature of 350° C. and a pressure of 3.5 MPa. The steam is then input into the second ejector, where the flash steam with a temperature of 140° C. and a pressure of 0.4 MPa and the condensate water in the second pipeline are suck and mixed to form working steam with a temperature of 300° C. and a pressure of 2.5 MPa. The second ejector is provided with a first ejection port for ejecting steam, and a second ejector for ejecting hot water, so as to maintain equipment stability when the supply of flash steam is insufficient.

In order to maintain the temperature and pressure in the flash drum, a heat exchange coil is arranged in the flash drum, and the heat exchange coil is connected with a third heat exchanger to form a heat exchange circulation pipeline. A heat source inlet of the third heat exchanger is connected to the discharge port of the setting machine, and a heat source outlet of the third heat exchanger is connected to the end of the discharge port of the setting machine, for heating the heat exchange medium (heat transfer oil) in the heat exchange circulation pipeline using the waste heat discharged from the setting machine. Driven by an oil pump, the heat exchange medium circulates for heat exchange, thereby heating the flash drum, so that a stable supply of flash steam is formed in the flash drum.

Preferably, a first control valve is provided between the heat source generator and the injection port of the first ejector, and a second control valve is provided between the first ejector and the second ejector. A third control valve is set between the flash drum and the first ejector, and a fourth control valve and a fifth control valve are respectively set between the flash drum and the ejector ports of the second ejector. Through corresponding adjustment, the high-temperature and high-pressure steam supplied by the heat source generator can be adjusted into working steam without loss of heat source.

The printing and dyeing factory also includes a dyeing vat and drying unit. The water temperature of dyeing vat is much lower than the discharge water of the flash drum. In order to effectively utilize the waste heat discharged from the setting machine, the flash drum is provided with a second water outlet which is connected to the dyeing vat, and part of the hot water is added to the dyeing vat to adjust the temperature of the dyeing vat. In order to prevent the discharged hot water from polluting the dyeing vat, a filter device is provided on the pipeline between the flash drum and the dyeing vat. A buffer tank is set between the flash drum and the dyeing vat, the hot water of the flash drum enters the dyeing vat after passing through the buffer tank, and the flash hot water can be flexibly adjusted to the dyeing vat according to the steps of the printing and dyeing process. Because the water temperature of the dyeing vat only needs to be about 50° C., while the temperature of the high-pressure hot water in the flash drum reaches 140° C., in order to adjust the temperature of the hot water input into the dyeing vat and effectively utilize the heat discharged from the flash drum, a second heat exchanger is arranged on a connecting pipeline between the flash drum and the dyeing vat. After passing through the second heat exchanger through a fan, the cold air exchanges heat with the hot water at 140° C. to form hot air, which provides hot air for the drying unit through the connection between the pipeline and the drying unit, and dries the printed fabric, which can effectively reduce the energy consumption of the drying unit and save production costs.

In addition, a first heat exchanger is arranged on the steam discharge port of the setting machine, a cold air input pipe is connected to an air inlet of the first heat exchanger through a fan, and an air outlet of the first heat exchanger is connected to an inner cavity of the setting machine. The exhaust gas up to 180° C. discharged from the steam discharge port of the setting machine passes through the first heat exchanger to heat the cold air which is then input into the inner cavity of the setting machine, which can reduce the heat loss in the inner cavity of the setting machine and reduce energy loss, which is beneficial to maintain the temperature stability in the setting machine and improve the production quality.

The above are only preferred embodiments of the present invention, and should not limit the scope of the present invention, that is, all simple equivalent changes and modifications made according to the patent scope of the present invention and the description of the invention are still belonged to the scope covered by the patent of the present invention.

What is claimed is:

1. A heating-energy-saving equipment for a printing and dyeing factory, comprising: a heat source generator, a first ejector, a second ejector, a flash drum and a setting machine that utilizes steam and comprises a steam input port and a waste steam discharge port; wherein a steam outlet of the heat source generator is connected to an injection port of the first ejector through a pipeline, an outlet of the first ejector is connected to an injection port of the second ejector, an outlet of the second ejector is connected to the steam input port of the setting machine, the waste steam discharge port of the setting machine is connected to an input port of the flash drum through a pipeline, a water outlet of the flash drum is provided with a first branch pipe connected to the injection port of the first ejector, the second ejector is provided with a first ejector port and a second ejector port, the water outlet of the flash drum is provided with a second branch pipe which is connected to the first ejector port of the second ejector, and a steam outlet of the flash drum is connected to the second ejector port of the second ejector.

2. The heating-energy-saving equipment for the printing and dyeing factory according to claim 1, wherein a first control valve is provided between the heat source generator and the injection port of the first ejector, and a second control valve is provided between the first ejector and the second ejector.

3. The heating-energy-saving equipment for the printing and dyeing factory according to claim 2, wherein a third control valve is disposed between the flash drum and the first ejector, and a fourth control valve and a fifth control valve are disposed between the flash drum and the second ejector.

4. The heating-energy-saving equipment for the printing and dyeing factory according to claim 3, wherein a heat exchange coil is arranged in the flash drum, and the heat exchange coil is connected with a third heat exchanger to form a heat exchange circulation pipeline.

5. The heating-energy-saving equipment for the printing and dyeing factory according to claim 2, wherein the heat source generator is a waste heat boiler or a waste incineration boiler.

6. The heating-energy-saving equipment for the printing and dyeing factory according to claim 1, wherein the printing and dyeing factory also comprises a dyeing vat, and the flash drum is provided with a second water outlet which is connected to the dyeing vat.

7. The heating-energy-saving equipment for the printing and dyeing factory according to claim 6, wherein a buffer tank is set between the flash drum and the dyeing vat.

8. The heating-energy-saving equipment for the printing and dyeing factory according to claim 7, wherein a second heat exchanger is arranged on a connecting pipeline between the flash drum and the dyeing vat.

* * * * *